United States Patent [19]

Smith et al.

[11] Patent Number: 5,622,600
[45] Date of Patent: Apr. 22, 1997

[54] DYED PARTICULATE OR GRANULAR MATERIALS FROM RECYCLED PAPER AND PROCESS FOR MAKING THE MATERIALS

[75] Inventors: Kim A. Smith, North Haledon; Edward G. Knapick, Ogdensburg; Brent Willemsen, Westfield; Ernest P. Wolfer, Allendale, all of N.J.

[73] Assignee: Marcal Paper Mills, Inc., Elmwood Park, N.J.

[21] Appl. No.: 477,273

[22] Filed: Jun. 7, 1995

Related U.S. Application Data

[63] Continuation-in-part of Ser. No. 118,186, Sep. 9, 1993, abandoned.

[51] Int. Cl.[6] .................................................. D21F 1/66
[52] U.S. Cl. .................. 162/190; 162/162; 162/4
[58] Field of Search ........................... 162/162, 189, 162/190, DIG. 9, 4; 119/172

[56] References Cited

U.S. PATENT DOCUMENTS

| | | |
|---|---|---|
| 622,054 | 3/1899 | Marsden . |
| 888,148 | 5/1908 | Kokkenwadel . |
| 892,754 | 7/1908 | May . |
| 907,403 | 12/1908 | Redfearn . |
| 966,060 | 8/1910 | Severns . |
| 1,758,735 | 5/1930 | Conrad . |
| 2,182,274 | 12/1939 | Baker et al. . |
| 2,198,013 | 4/1940 | Olcott . |
| 2,287,759 | 6/1942 | Hardesty et al. . |
| 2,877,599 | 3/1959 | Hebestreet et al. . |
| 2,880,519 | 4/1959 | Pollock . |
| 2,952,866 | 9/1960 | Sackett . |
| 3,003,911 | 10/1961 | Lindstrom et al. . |
| 3,011,876 | 12/1961 | Raistrick . |
| 3,047,453 | 7/1962 | Shook, Jr. . |
| 3,059,615 | 10/1962 | Kuceski et al. . |
| 3,142,862 | 8/1964 | Guldman . |
| 3,188,751 | 6/1965 | Sutton . |
| 3,235,444 | 2/1966 | Kruger . |
| 3,252,785 | 5/1966 | Hoblit . |
| 3,256,857 | 6/1966 | Karras . |
| 3,381,460 | 5/1968 | Sokolowski . |
| 3,449,106 | 6/1969 | Paden et al. . |
| 3,506,536 | 4/1970 | Jacquelin . |
| 3,564,083 | 2/1971 | Fournet et al. . |
| 3,574,050 | 4/1971 | Rice . |
| 3,589,977 | 6/1971 | Fournet . |
| 3,672,945 | 6/1972 | Taylor . |
| 3,675,625 | 7/1972 | Miller et al. . |
| 3,723,321 | 3/1973 | Thomas . |
| 3,747,564 | 7/1973 | Bickoff et al. . |

(List continued on next page.)

FOREIGN PATENT DOCUMENTS

| | | |
|---|---|---|
| 957788 | 11/1974 | Canada . |
| 0039522 | 11/1981 | European Pat. Off. . |
| 0111467 | 6/1984 | European Pat. Off. . |
| 1454743 | 1/1969 | Germany . |
| 2358808 | 6/1975 | Germany . |
| 3017352 | 11/1981 | Germany . |
| 3343965 | 12/1984 | Germany . |
| 52-45595 | 4/1977 | Japan . |
| 52-62189 | 5/1977 | Japan . |
| 53-51662 | 5/1978 | Japan . |
| 293892 | 7/1928 | United Kingdom . |

OTHER PUBLICATIONS

McGraw-Hill Encycloedia of Science & Technology, 6th Edition, pp. 436–450.

*Primary Examiner*—Brenda A. Lamb
*Attorney, Agent, or Firm*—Burns, Doane, Swecker & Mathis, L.L.P.

[57] ABSTRACT

In a process for making a particulate or granular material from a reject stream from a coated grade waste paper pulp stock recycling process, fibers for use in making paper are removed, the remaining solid material in the reject stream is dyed and then separated. Water is removed from the reject stream to increase its consistency and form dyed particles or granules. The process and characteristics of particulate and granular material formed by the process are described.

27 Claims, 1 Drawing Sheet

U.S. PATENT DOCUMENTS

| | | |
|---|---|---|
| 3,789,797 | 2/1974 | Brewer . |
| 3,828,731 | 8/1974 | White . |
| 3,900,547 | 8/1975 | Hunt et al. . |
| 3,904,726 | 9/1975 | Jacquelin et al. . |
| 3,916,831 | 11/1975 | Fisher . |
| 3,921,581 | 11/1975 | Brewer . |
| 3,929,446 | 12/1975 | Trocino . |
| 3,942,970 | 3/1976 | O'Donnell . |
| 3,980,050 | 9/1976 | Neubauer . |
| 4,106,991 | 8/1978 | Markussen et al. . |
| 4,108,932 | 8/1978 | Takewell et al. . |
| 4,116,760 | 9/1978 | Kennedy . |
| 4,134,725 | 1/1979 | Büchel et al. . |
| 4,137,029 | 1/1979 | Brooks . |
| 4,148,952 | 4/1979 | Nelson et al. . |
| 4,157,696 | 6/1979 | Carlberg . |
| 4,163,674 | 8/1979 | Been . |
| 4,203,388 | 5/1980 | Cortigene et al. . |
| 4,225,382 | 9/1980 | Kearney et al. . |
| 4,241,001 | 12/1980 | Lamond et al. . |
| 4,263,873 | 4/1981 | Christianson . |
| 4,269,859 | 5/1981 | Morse . |
| 4,277,328 | 7/1981 | Pfalzer et al. . |
| 4,305,345 | 12/1981 | Otoguro . |
| 4,311,115 | 1/1982 | Litzinger . |
| 4,341,100 | 7/1982 | Cortigene . |
| 4,341,180 | 7/1982 | Cortigene et al. . |
| 4,343,680 | 8/1982 | Field et al. . |
| 4,343,751 | 8/1982 | Kumar . |
| 4,356,060 | 10/1982 | Neckermann et al. . |
| 4,374,794 | 2/1983 | Kok . |
| 4,378,756 | 4/1983 | Whiteman . |
| 4,407,231 | 10/1983 | Colborn et al. . |
| 4,409,925 | 10/1983 | Brundrett et al. . |
| 4,438,263 | 3/1984 | Morse . |
| 4,458,629 | 7/1984 | Gerber . |
| 4,459,368 | 7/1984 | Jaffee et al. . |
| 4,492,729 | 1/1985 | Bannerman et al. . |
| 4,495,482 | 1/1985 | Philipp . |
| 4,497,688 | 2/1985 | Schaefer . |
| 4,537,877 | 8/1985 | Ericsson . |
| 4,560,527 | 12/1985 | Harke et al. . |
| 4,619,862 | 10/1986 | Sokolowski et al. . |
| 4,621,011 | 11/1986 | Fleischer et al. . |
| 4,664,064 | 5/1987 | Lowe . |
| 4,712,508 | 12/1987 | Lowe . |
| 4,721,059 | 1/1988 | Lowe et al. . |
| 4,734,393 | 3/1988 | Lowe et al. . |
| 4,832,700 | 5/1989 | Kaspar et al. . |
| 4,888,092 | 12/1989 | Prusas et al. . |
| 4,915,821 | 4/1990 | Lamort . |
| 4,930,443 | 6/1990 | Lowe, Jr. et al. . |
| 4,931,139 | 6/1990 | Philips . |
| 4,983,258 | 1/1991 | Maxham . |
| 5,002,633 | 3/1991 | Maxham . |
| 5,019,564 | 5/1991 | Lowe et al. . |
| 5,094,604 | 3/1992 | Chavez et al. . |
| 5,146,877 | 9/1992 | Jaffee et al. . |
| 5,176,822 | 1/1993 | Iwashige et al. . |
| 5,196,473 | 3/1993 | Valenta et al. . |
| 5,316,621 | 5/1994 | Kitao et al. . |
| 5,332,474 | 7/1994 | Maxham . |
| 5,352,780 | 10/1994 | Webb et al. . |

DYED PARTICULATE OR GRANULAR MATERIALS FROM RECYCLED PAPER AND PROCESS FOR MAKING THE MATERIALS

CROSS REFERENCE TO RELATED APPLICATIONS

This application is a continuation-in-part of copending application Ser. No. 08/118,186, filed Sep. 9, 1993.

FIELD OF THE INVENTION

The present invention relates to dyed particulate or granular materials, and more particularly to recycling processes for making dyed particulate or granular soil conditioner materials, as well as other dyed particulate or granular materials from waste paper.

BACKGROUND OF THE INVENTION

Paper recycling has, in recent years, become a more important and attractive option to disposal of waste paper by deposition in landfills or by incineration. It has been a common practice for many years to make paper, especially tissue, from recycled paper. Typically, the waste paper is supplied to a hydropulper where the paper is pulped with caustic, dispersants and large amounts of water to form a slurry of long fibers, short fibers, fines and fillers.

Copending application Ser. No. 08/118,186 discloses processes for utilizing waste paper, preferably office waste that is printed with laser print, photocopier print, or other inks, and magazines that have a coated surface. The waste paper is pulped with water, caustic and surfactants to produce a slurry containing paper fibers, paper fines and fillers. After several washing steps, the slurry passes through a wire washer which has screens that separate papermaking fibers from fines and fillers. The papermaking fiber stream, also referred to as the "accepts stream", is directed to a cleaning and de-inking step and then to a conventional papermaking machine for processing into paper. The filtrate from the washer continues through the process to a flotation clarifier where the suspended solids (fines and filler) are concentrated as a flotate and clarified water is removed for reuse in the process.

The flotate is further passed through a belt press where the water content is further reduced. The product from the belt press is in the form of a wet, particulate filter cake. The wet filter cake then passes, by means of a screw conveyor, to a pin mixer. The filter cake is broken up in the screw conveyor and the pin mixer. The pin mixer reduces the size of the particles as compared to the size of the particles that are discharged from the screw conveyor. The wet particles or granules are then sent through a conveyor dryer to produce dry absorbent particles or granules having a moisture content less than 10% by weight. The resulting particles or granules have an irregular shape and have good absorbent characteristics.

There are many processes available for recycling waste paper to recover clay, fibers and other by-products. Many of these processes utilize a hydropulping or fiber releasing step in which a low consistency water slurry is formed. Some of these processes produce particles or granules that are gray in color. Other processes produce particles or granules having a color which is dependent on the color of paper being produced in papermaking machines whose flow systems are part of these processes.

It would be desirable to mix the dry granules from the above process with soil as a soil conditioner. The granules help to keep soil loose and aerated, as well as help retain moisture. However, since the granules from the pin mixer are typically gray in color, mixture with soil as a conditioner does not provide a product which appears rich and fertile. Thus, the product does not provide the potential of high percentage blending with soil. Likewise, use of such particles for other products such as absorbents or agricultural chemical carriers may not be desirable due to their color.

It is possible to dye the particles from recycling processes. However, due to factors such as the high surface area and the absorbency of the particles, it is extremely costly to obtain significant color change since large quantities of dye are necessary. Further, dye retention is a problem due to interference from commonly used flocculating polymers. Accordingly, improved methods for recycling waste paper to provide products of a desired color are needed.

SUMMARY OF THE INVENTION

It is an object of the present invention to provide an improved process for recycling waste paper and, in particular, an improved process for producing dyed particulate or granular soil conditioners and other dyed materials.

The process of this invention utilizes waste paper, preferably office waste that is printed with laser print, photocopier print, or other inks, and magazines that have a coated surface. The waste paper is pulped with water, caustic and surfactants to produce a slurry containing paper fibers, paper fines and filler. The slurry passes through a wire washer which separates papermaking fibers from the fines and filler. Papermaking fibers are a mixture of long and short fibers, although it is recognized that some of the short fibers will pass through the screens. For purposes of this description, long fibers are greater than about 1 mm in length and short fibers are between 1 mm and about 0.1 mm in length.

In the process described in copending application Ser. No. 08/118,186, a flocculating polymer is added to the filtrate and then the filtrate is directed to a flotation clarifier where the suspended solids are concentrated as a flotate and clarified water is removed for reuse in the process. In contrast to the process described in copending application Ser. No. 08/118,186, the process of the present invention includes adding a dye to the filtrate prior to introduction of a flocculating polymer, and then directing the filtrate to a flotation clarifier where the suspended solids are concentrated.

Accordingly, the present invention is directed to making a specifically dyed particulate or granular material and, in particular, specifically dyed particulate or granular soil conditioner materials. The process includes the steps of:

(a) forming a slurry from waste paper containing kaolin clay, cellulosic material, and other solid components;

(b) removing fibers for papermaking from the slurry;

(c) adding dye to the slurry;

(d) adding a flocculating polymer to the slurry containing the dye;

(e) clarifying the slurry to produce a main concentrated stream of solid components and dye;

(f) de-watering the concentrated stream to produce a filter cake; and (g) breaking up the filter cake to produce particles or granules containing the dye.

The processes of the present invention may be used to make dyed particles or granules formed from a reject stream from a coated grade waste paper pulp stock recycling process. The particles or granules may have a solids content of preferably 35 to 60% by weight and the dye is fixated in the particles or granules by means of a flocculating polymer.

Alternatively, the particles or granules produced by this process may have a higher dry solids content and even have a high absorbency toward liquids especially when dried to a dry solids content greater than 90% by weight. These particles or granules are useful for a variety of applications particularly as absorbents that have a specific desirable color.

DESCRIPTION OF THE DRAWING

A preferred embodiment of the process of this invention is illustrated in the accompanying drawing, in which.

DETAILED DESCRIPTION OF PREFERRED EMBODIMENTS

Figure 1:
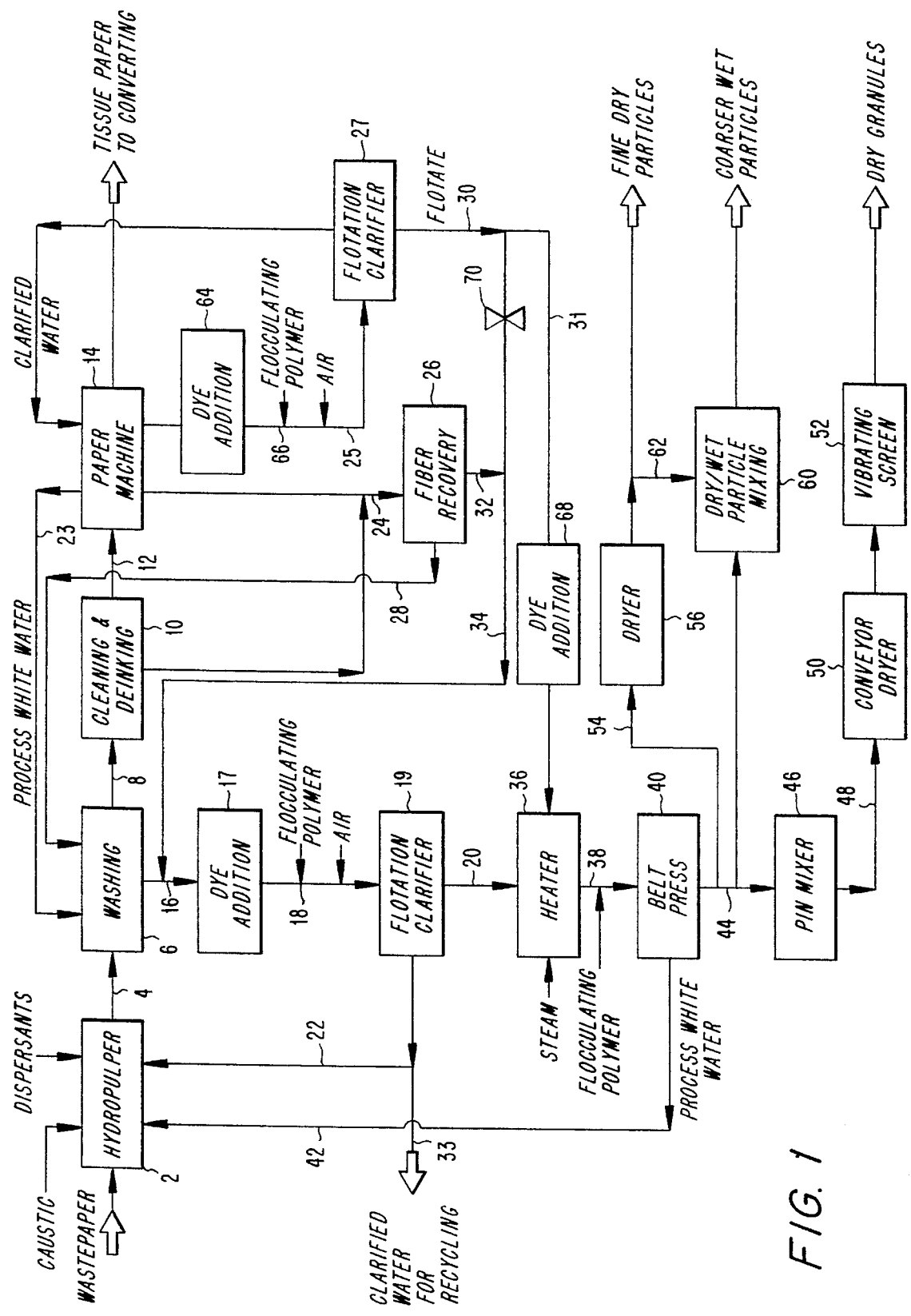
FIG. 1 is a schematic view of the process and apparatus for performing the process for manufacturing the dyed particulate or granular materials according to the present invention.

The process of this invention utilizes waste paper that is collected from offices or other sources that contain primarily recyclable paper grades, including magazines (with clay-based coatings) and writing grades (with laser print, photocopier print and other inks). Such paper may be formed into a slurry to recycle cellulosic material, i.e., cellulosic fibers and cellulosic fines, as well as other organic and inorganic materials.

Referring to FIG. 1, waste paper is supplied to a hydropulper 2 along with clarified water, caustic agents, such as sodium hydroxide, and dispersants to separate the fiber from the other components of the waste paper. Plastics, debris and other foreign objects are removed by conventional means. The pulp slurry from the hydropulper, which contains more than 95% water, passes through a pipe 4 to a washer 6 where several conventional washing steps are performed. In the washer 6, the slurry flows over wire screens where fibers useful for papermaking are retained on the screens and the reject stream passes through the screen and is conducted out of the washer through a pipe 8. The screens have slotted openings of about 100 to 300 microns in width. Fibers suitable for papermaking preferably collect on the surface of the screens, while small particles, such as kaolin clay, cellulose fines and other suspended solids pass through the screens. Some of the fibers suitable for papermaking may also pass endwise through the screens. The fibers that are retained on the screen are subject to further cleaning, de-inking and processing, indicated at 10, before being supplied through a pipe 12 to a papermaking machine 14.

Mill process effluent that contains papermaking fibers may be recovered and recycled to increase the efficiency of the papermaking process. This effluent would include reject water streams, spills from pulp and paper mills, etc. In FIG. 1, the effluent stream would include a process white water stream 23 from the papermaking machine 14, an overflow stream 24 which would previously have been discharged to a sewer, and a white water stream 25. The process white water 23 is returned to the washer 6. The overflow stream 24 is supplied to a fiber recovery process 26 where the stream passes through screens that separate the papermaking fibers in a similar manner to the washer 6. Papermaking fibers with water are supplied through the pipe 28 from the fiber recovery unit 26 to the washer 6. The white water stream 25 is supplied to a flotation clarifier 27 where the flocculated suspended solids are removed as a flotate 30. Clarified water is recycled back to the paper machine.

The reject stream from the wire screen washer 6 is in the form of a slurry typically containing less than 1.5% solids, including cellulosic fines and fillers. Typically 50% of the solids by weight are fillers such as kaolin clay, calcium carbonate and titanium dioxide. The remaining 50% is typically cellulose fibers which are less than about 1 mm in length, cellulose fines with some sugars, tannins, lignins, etc.

The reject stream from the wire screen washer is mixed with the rejects from the flotation clarifier 27 and the fiber recovery unit 26. This mixed slurry, which preferably contains between 98.5% and 99.5% water, is conducted through the pipe 16 to a dissolved air flotation clarifier 19.

Prior to introduction of the mixed slurry to the dissolved air flotation clarifier 19, a flocculating polymer is added as indicated at 18 and dye is added at 17 prior to addition of the flocculating polymer. While the location of dye addition unit 17 is shown on pipe 16, it may be located at any point along pipe 30, pipe 32, pipe 34 or pipe 16. Preferably, dye is added at the point furthest away from flocculating polymer addition 18 to provide the maximum contact time possible in the slurry prior to addition of the flocculating polymer. Alternatively, dye may be added at multiple places prior to introduction of the flocculating polymer. For example, dye may be added at any one or more combinations of pipe 16, pipe 30, pipe 32 and/or pipe 34.

Preferably, dye is added in an amount of between 1 and 20 pounds per ton of filter cake. Even more preferably, the dye is added in an amount of between 2 and 15 pounds or between 4 and 10 pounds per ton of final product. Of course, more or less dye may be added depending on the type of dye and desired color.

Preferred dyes include basic dyes which are expected to provide the greatest efficiency. Typically, these dyes are salts of organic bases containing amino and imino groups. The colored base is combined with a colorless acid, such as acetic, hydrochloric or sulfuric, and in solution, the dye is cationic (carrying the positive charge). These dyes have exceptional color intensity or brilliance. Suitable basic dyes for providing an earth-tone color for use in making soil conditioners are commercially available (e.g., BAZOSOL™ Brown 43L from BASF).

Other dyes which are suitable include acid or direct dyes. Typically, these dyes are salts of organic acids (such as sulfonic and carboxylic) and are usually marketed as the sodium salt. The acid groups confer water solubility on the dyestuff molecule. When dissolved, the dye ionizes (separates into particles with opposite electric charges), with the dye structure being anionic (carrying the negative charge). These dyes have improved fastness. Suitable direct dyes for providing various colors are commercially available (e.g., FASTUSOL™ Yellow 70L, FASTUSOL™ Black 18L, FASTUSOL™ Orange 49L and FASTUSOL™ Red 50L each from BASF).

Furthermore, other dyes may be suitable for use in the present invention. These dyes include, but are not limited to, mordant dyes, ingrain dyes, disperse dyes, vat dyes, sulfur dyes, solvent dyes and reactive dyes. Each of these dyes are described in, e.g., McGraw-Hill Encyclopedia of Science & Technology, 6th Edition, Volume 5, pp. 436–450 (1987), the contents of which are hereby incorporated by reference. Of course, mixtures and combinations of one or more dyes may be employed.

The color of the dye is dependent upon the desired color of the final product. Any one of a large number of colors could be achieved by selection of an appropriate dye or combination of dyes. Such dye colors include but are not limited to red, reddish orange, orange, orange yellow, yellow, greenish yellow, yellow green, green, bluish green, greenish blue, blue, purplish blue, violet, purple, reddish purple, purplish red, purplish pink, pink, yellowish pink, brownish pink, brownish orange, reddish brown, brown, yellowish brown, olive brown, olive, olive green, white, gray and black dyes. Likewise, it is expected that the additive primary colors (which may be mixed to produce all colors) of red, green and blue wavelengths or combination thereof; subtractive primary colors (substances that reflect light of one of certain wavelengths and absorb light of other wavelengths) of magenta, yellow and cyan or combinations thereof; and psychological primary colors of red, yellow, green and blue, plus the achromatic pair black and white (all colors may be subjectively conceived as mixtures of these) may be utilized to achieve a desired color.

Additionally, the color of the dye may be selected to neutralize the color effect normally made by the dyes utilized in producing colored paper. By neutralizing the dye utilized to make colored paper, particles of the same or very similar hue to particles obtained from recycling processes not making colored paper may be obtained. For example, if the product obtained by a paper recycle process typically produces a grey absorbent particle, but the paper being produced contains a red dye so that the particles produced by the recycling process are red, a combination of suitable dyes may be added to neutralize the red color. Using this process, particles having the usual grey color may be obtained. In the case of a red paper manufacturing process, a combination of yellow (e.g., BASF 58L yellow) and blue (e.g., Crompton & Knowles BTS blue) dye may be added to neutralize the red color and achieve the desired grey color. By neutralizing the effect of the color of the paper being produced, the recycling process need not be interrupted due to changes in color of the paper being recycled.

In an optional one embodiment of the invention, which is particularly advantageous in the case of neutralizing the color effect normally made by the dyes utilized to make colored paper, the dye may be added at 64 prior to addition of the flocculating polymer. Then, the slurry may be directed to flotation clarifier 27. By introduction of the dye prior to addition of the flocculating polymer, increased dye efficiency may be achieved as more fully discussed below.

In another optional embodiment of the invention, which is also particularly advantageous in the case of neutralizing the color effect normally made by the dyes utilized to make colored paper, the dye may be added at 68. While dye addition 68 is shown on line 31, dye addition 68 may be placed on line 30, especially if no flotate from flotation clarifier 27 is directed to line 16. While dye addition 68 does not achieve as high of an efficiency as dye addition 64, this embodiment is particularly advantageous since it does not require removing unwanted dye from the clarified water recycled to the paper machine 14.

In the above optional embodiments, wherein dye addition is before flotation clarifier 27 (dye addition 64) or after the flotation clarifier 27 (dye addition 68), the flotate from the flotation clarifier 27 may also be conveyed directly to heater 36 through pipes 30 and 31. By directing the flotate from flotation clarifier 27 directly to heater 36, one can avoid further processing through line 34, dye addition 17, flocculating polymer addition 18 and flotation clarifier 19. In fact, in such embodiments, line 30 need not even be connected to line 34 or may be isolated with an optional valve shown as 70.

Additionally, in the above embodiments, especially when dye addition is used to solely neutralize the color effect normally made by the dyes utilized to make colored paper, dye addition 17 may be eliminated. This is particularly true if the color of the solids from washing step 17 does not need to be changed such as is the case when the desired product is grey.

Suitable clarifiers are commercially available (e.g., Supracell from Krofta, or Deltafloat from Meri). A flocculating polymer, such as Drewfloc 441 from Drew Chemical Co., or Calgon TRP 945, and air are added to the reject stream in the pipe 16 before it enters the clarifier. The slurry fills the clarifier 19, and the flocculated suspended solids float on the air bubbles to the surface of the clarifier. At this point, the mat of solids, which has a consistency of 3–9%, is skimmed or raked off the surface and removed from the clarifier through the pipe 20. The clarified water from the clarifier 18 is conducted back into the hydropulper 2 through the pipe 22 to be reused and a portion of the clarifier water is recycled via pipe 33 to other places.

The flotate from the clarifier 18 is desirably supplied to a heater 36. The heater 36 may be of any suitable type, such as a steam injection unit, or a heat exchanger. The flow rate of the stream and the heat applied should be sufficient to raise the temperature of the stream for sufficient time to achieve pasteurization of the stream. Preferably, the stream should be heated to a temperature of at least 160° F.

The stream passes out of the heat exchanger 36 through a pipe 38, and a second flocculating polymer (such as Drewfloc 453 from Drew Chemical Co.) is added to the slurry to cause the solids to flocculate as slurry enters a belt press 40. The belt press can be any one of the commercially-available units (e.g., Kompress Belt Filter Press, Model GRS-S-2.0 from Komline Sanderson). At the outlet of the belt press, the filter cake has 35–45%, preferably 36–40% solids.

If a filter cake having a higher solids content is desired, a screw press may be used after the belt press, or instead of the belt press. Alternatively, a belt press with compressive rolls can be employed. The filter cake would pass through the nip between the rolls for additional dewatering. These arrangements can be used to produce a filter cake having a solids content of up to 50%.

The filter cake is in the form of a sheet of wet particles which readily falls apart. The particles have a bulk density of 45 to 70 lbs/ft$^3$, preferably 50 to 60 lbs/ft$^3$ and a particle size of 1 to 100 mesh, preferably 4 to 60 mesh. Process white water from the belt press is returned to the hydropulper 2 through the pipe 42.

If small particles are desired as the final product, the filter cake from the belt press 40 is conveyed by means of a screw conveyor 44 to a pin mixer 46, dryer 56 and/or dry/wet granule mixer 60 for further dewatering or drying. The filter cake breaks up as it passes through the screw conveyor 44.

The pin mixer 46 (such as the Turbulator from Ferro-Tech) has a cylindrical shell and a rotatable shaft mounted on the central axis of the shell. The shell is stationary and is supported on a frame so that the central axis of the shell is horizontal. The shaft has radial pins that are spaced about ⅛" from the interior wall of the shell. Pieces of the filter cake from the conveyor 44 are deposited in the shell at one end of the shell. The rate of filling of the shell should be adjusted so that the cake material occupies only about 2% of the volume of the shell.

By maintaining a low density in the pin mixer 46, the filter cake is further broken up by the rotating pins so that individual granules are separated as the material progresses from the inlet of the pin mixer to the outlet. No additional binders are necessary since the matrix produced by the kaolin clay, along with the lignin, tannin, starch and short fibrils in the feedstock, serve as the binder for the granules. The resulting open pore structure yields an absorbent irregular particle.

From the pin-mixer 46, the granulated, but still moist stream material may be directed, preferably under the force of gravity on a swing conveyor 48, to the belt of a conveyor drier 50, such as a Proctor & Schwartz two-stage conveyor dryer. The conveyor dryer 50 preferably includes a housing through which the granular material moves while supported on the belt. The belt is porous and a heater blows hot air though the belt to dry the granules. At the outlet, the granules may have any desired solids content depending on the length and extent of drying. In the case of soil conditioners or other materials that do not require extensive drying, a desirable solids content is 40 to 60%, preferably 45 to 50% by weight. In the case of absorbent materials, a preferred minimum solids content is 90% by weight, and preferably greater than 95%. Of course, soil conditioners may also have a high solids content.

The granules from the conveyor dryer 50 typically vary in size. In at least one embodiment, 50% may be retained on an 8×16 mesh screen, i.e., 50% would pass through an U.S. Sieve No. 8 mesh screen but would be retained on a 16 mesh screen. In these embodiments, the remaining portion may be 44% in the 16×30 mesh size range, and 6% in the 30×60 mesh size range. The granules which are dried to a significant extent preferably have a bulk density of between 30 and 40 lbs/cu. ft.

Alternatively, the particles or granules from the pin mixer 46, may be used without further drying and/or mixed with dried granules to provide the desired solids content. This avoids the need for a separate drying step for those granules which do not require a high solids content.

Vibrating screens 52, such as manufactured by Sweco, may be used to classify the material by size according to product specifications.

Additionally, the filter cake from the belt press 40 may be conveyed via 54 to a dryer 56 (such as a Komline Sanderson paddle-type dryer). In the dryer 56, the filter cake particles are further dried and may be ground into smaller particles. The dried particles may have any desired solids content depending on the time and extent of drying. Preferably, the particles have a solids content of 90 to 100% by weight. Even more preferably, the particles have a solids content of 96 to 99% by weight. Also, the particles desirably have a bulk density of from 45 lbs/ft$^3$ to 50 lbs/ft$^3$ and a size ranging from 4 to 300 mesh.

The particles from dryer 56 may be used directly as a product, or optionally mixed with wet filter cake particles at the dry/wet particle mixing stage 60. The dry particles from dryer 56 are conveyed through 62. The wet particles are conveyed through 58. Alternatively, the dried particles from dryer 56 may be returned to the main conveyor 44 and mixed with the filter cake particles to produce a final product. Preferably, the dry/wet particle mixing whether in a separate mixing stage 60 or in the main conveyer 44 provides a product having a solids content of from 40 to 60% by weight, preferably 45 to 50% by weight. Alternatively, the wet particles from the belt press 40 may be used directly with little or no mixing of dry particles. The particles used as a final product either with or without addition of dry particles from the dryer 56 have a bulk density of from 50 lbs/ft$^3$ to 60 lbs/ft$^3$ and a size ranging from 4 to 100 mesh. The mixing ratio of dry particles from dryer 56 to wet particles from belt press 40 ranges from 0 to 50% by weight, preferably 5 to 30% by weight.

The purpose of the heater 36 is to prevent the growth of bacteria in the material provided by this process. If the filter cake or the granules from the pin mixer 46 are conducted through a dryer, as described above, the heater 36 may be omitted since any bacteria will be killed in the dryer. However, if coarse wet particles are produced, it is necessary to kill bacteria. An alternative to the heater would be the use of a stationary horizontal cylinder with a rotating auger that would advance the particles through the cylinder. Steam injected into the cylinder would heat the material sufficiently to cause the bacteria to be killed.

The particles or granules produced by this process may have a solids content of approximately 50% by weight of organic materials, such as cellulosic material, starches, tannins and lignins. The particles or granules may contain less than 10% long fiber. The inorganic fillers may comprise about 50% by weight of the solids content of the granules and are made up primarily of kaolin clay, calcium carbonate and titanium dioxide. The granules typically have an irregular, generally spherical shape.

The particles or granular material according to the present invention are preferably able to withstand agitation such as might occur during shipment, handling, and storage. Resistance to attrition of the granules is preferably between 90 and 95%. This percentage is based on the following test procedure. A weight of 75 grams of sample is shaken on a 60 mesh screen for ten minutes and 50 grams of the material retained is then shaken in a pan for ten minutes with ten steel balls (⅝" in diameter). The entire sample is then shaken on a 60 mesh screen for ten minutes. The percentage of the original 50 grams retained on the 60 mesh screen is the resistance to attrition cited above.

The particles or granular material according to the present invention may have a pH between 8.5 and 9.4.

The particles or granular material according to the present invention may be adapted to absorb various liquids to desired degrees as a function of percentage of weight of the particles. The particulate or granular material according to the present invention for use as an agricultural carrier preferably has a liquid holding capacity (LHC) toward odorless kerosene of between 25 and 30%. The material for use as a floor absorbent, when tested with material retained on an 8×35 mesh, preferably is able to absorb between about 70 and 80% of its weight of water, and preferably between about 50 and 60% of its weight of oil. The dyed granular materials adapted to absorb various liquids are desirably dried to a solids content of greater than 90% by weight.

The processes of the present invention and products produced therefrom are particularly advantageous since initial research on dyeing the gray granular products has proven extremely cost prohibitive. The first attempts in dyeing the product included adding dye directly onto the finished product, and even onto the flocculated, predrained materials. These processes required about 100 pounds of dye per ton of product to make any significant color change. By moving the addition site of the dye prior to addition of the flocculating polymer, the dye was found to more readily adsorb onto the solids thus allowing for a substantial change in the desired color direction with a relatively small fraction of the amount of dye needed in processes wherein the dye is added after addition of the flocculating polymer. Preferably, significant color change or neutralization can be effected with 4 to 10 pounds of dye per ton of product according to the present invention.

The products of the present invention, which are made by the process of the present invention are also particularly advantageous. Since the dye is added prior to addition of the flocculating polymer, the flocculating polymer tends to act as a dye-fixing agent and the dye is evenly distributed throughout the final product. This fixing activity can also seal off bonding sites on particles, thus making dyeing of the flocculated particles very difficult.

It is believed that the flocculating polymer seals-off or inhibits dye adsorption. Consequently, if the dye is added prior to introduction of the flocculating polymer, the dye is able to absorb onto the solids without the inhibiting effect of the flocculating polymer. Further, when the flocculating polymer is added, the flocculating polymer acts to fix or seal in the dye thus making a more colorfast product. Consequently, by addition of the dye before the flocculating polymer, less quantities of dye are required to achieve a desired color or neutralize an undesired color. In contrast, if the dye is added after introduction of the flocculating polymer, excessive amounts of dye would be required to achieve minimal color change.

While this invention has been illustrated and described in accordance with preferred embodiments, it is recognized that variations and changes may be made therein without departing from the invention as set forth in the claims.

What is claimed is:

1. A process for dyeing granular material made from waste paper containing kaolin clay, cellulosic material, and other solid components, comprising the steps of:
    (a) forming a slurry from waste paper containing kaolin clay, cellulosic material, and other solid components;
    (b) removing fibers for papermaking from the slurry;
    (c) adding dye to the slurry;
    (d) adding a flocculating polymer to the slurry containing said dye;
    (e) clarifying the slurry to produce a concentrated stream of solid components and dye;
    (f) de-watering the concentrated stream to produce a filter cake; and
    (g) breaking up the filter cake to produce a granular material.

2. The process according to claim 1, wherein the granular material is dried to a solids content of between 40 and 60% by weight.

3. The process according to claim 1, wherein the granular material is dried to a solids content of between 90 and 100% by weight.

4. The process according to claim 1, wherein the slurry before said dyeing and clarifying steps contains less than 1.5% solids.

5. The process according to claim 1, wherein said concentrated stream produced in said clarifying step has between 3% and 9% solids.

6. The process according to claim 1, wherein said dewatered concentrated stream has between 35 and 40% solids.

7. The process according to claim 1, wherein the dyeing step includes the addition of two or more dyes.

8. The process according to claim 1, wherein the dyeing step includes the addition of earth-tone dye.

9. The process according to claim 1, wherein the dyeing step includes the addition of brown dye.

10. The process according to claim 1, wherein the dyeing step includes the addition of cationic dye.

11. The process according to claim 1, wherein said dye is fixed to said granular material by said flocculating polymer.

12. The process according to claim 1, wherein said dye is utilized in an amount of between 1 and 20 pounds per ton of filter cake.

13. The process according to claim 12, wherein said dye is utilized in an amount of between 2 and 15 pounds per ton of filter cake.

14. The process according to claim 13, wherein said dye is utilized in an amount of between 4 and 10 pounds per ton of filter cake.

15. The process according to claim 1, wherein said step of adding dye to the slurry includes neutralizing the color of a dye used to produce the waste paper.

16. The process according to claim 1, wherein the granular material has the same color as said dye.

17. A process for dyeing absorbent materials comprising:
    (a) forming a slurry containing water, cellulosic material and kaolin clay;
    (b) adding dye to the slurry;
    (c) adding a flocculating polymer to the slurry;
    (d) clarifying the slurry to produce a concentrated stream of solid components;
    (e) dewatering the concentrated stream of solid components to produce a filter cake; and
    (f) forming the filter cake into absorbent materials, whereby the absorbent materials have a desired color.

18. The process according to claim 17, wherein the slurry is formed from colored paper and said step of adding dye to the slurry includes neutralizing the color of a dye used to produce the colored paper.

19. The process according to claim 17, wherein the slurry contains more than 98% water.

20. The process according to claim 17, wherein the filter cake after the dewatering step has a consistency of between about 35% and about 45%.

21. The process according to claim 17, wherein the dye is added to the slurry at a rate of between 1 and 20 pounds per ton of filter cake.

22. The process according to claim 17, wherein the absorbent materials have up to about 50% by weight organic material.

23. The process according to claim 17, wherein the absorbent materials have up to about 50% by weight inorganic material.

24. A process for producing granular materials of a predetermined color by neutralizing the color of a dye used to produce colored paper in a papermaking machine comprising:
    (a) forming a slurry containing water, cellulosic material and kaolin clay and having a first color;
    (b) supplying papermaking fibers from the slurry to a papermaking machine;
    (c) adding a dye of a second color to the papermaking fibers before the papermaking fibers are made into paper in the papermaking machine;
    (d) removing an aqueous slurry of suspended solids having the second color from the papermaking machine;
    (e) adding a dye of a third color to the slurry of suspended solids to neutralize the color of the dye of the second color used to produce the colored paper;

(f) adding a flocculating polymer to the slurry of suspended solids;
(g) clarifyiing the slurry of suspended solids to produce a concentrated stream of solid components;
(h) de-watering the concentrated stream of solid components to produce a filter cake having said first color; and
(i) forming the filter cake into granular materials.

25. The process according to claim 24, wherein said first color is gray.

26. The process according to claim 24, wherein the second color and said third color, when mixed, produce said first color.

27. The process according to claim 24, wherein said third dye is a salt of an organic base containing amino and imino groups.

* * * * *